United States Patent [19]

Legler et al.

[11] Patent Number: 4,548,246
[45] Date of Patent: Oct. 22, 1985

[54] HEADSTOCK ELEVATING APPARATUS

[75] Inventors: John G. Legler, Huber Heights; Robert L. Bartlett, Dayton; Charles J. Haas, Middletown; Garry W. Woods; John O. Clark, both of Dayton, all of Ohio

[73] Assignee: Shopsmith, Inc., Dayton, Ohio

[21] Appl. No.: 552,586

[22] Filed: Nov. 16, 1983

[51] Int. Cl.[4] .............................................. B27C 9/00
[52] U.S. Cl. .................................. 144/1 C; 144/286 A
[58] Field of Search .................... 144/1 R, 1 C, 286 R, 144/286 A, 287, 288 S; 82/32, 6 R; 409/240; 29/560

[56] References Cited

U.S. PATENT DOCUMENTS

| 1,044,816 | 11/1912 | Phillipson | 144/288 R |
|---|---|---|---|
| 1,719,755 | 7/1929 | Clavette | 292/173 |
| 2,664,122 | 12/1953 | Allen, Sr. | 409/240 |
| 2,927,612 | 3/1960 | Edgemond, Jr. et al. | 144/1 C |
| 2,964,075 | 12/1960 | Goldschmidt et al. | 83/477 |
| 3,282,309 | 11/1966 | Parker et al. | 144/1 C |
| 3,953,061 | 4/1976 | Hansen et al. | 292/36 |

Primary Examiner—W. D. Bray
Assistant Examiner—Jorji M. Griffin
Attorney, Agent, or Firm—Biebel, French & Nauman

[57] ABSTRACT

A multipurpose woodworking tool of the type having a frame, a pair of parallel way tubes extending longitudinally of the frame, and a headstock mounted on the way tubes in which the improvement comprises a pair of yokes joining the way tubes together at ends thereof, pairs of upright members at the ends of the frame and spaced apart to receive one of the yokes therebetween, and an apparatus extending between the yokes and the upright members which enables the way tubes to be changed in elevation between a lower elevation optimal for utilizing a table saw attachment mounted on the way tubes and a higher elevation optimal for utilizing a lathe attachment. In one embodiment, the apparatus includes spring-loaded pins which are sidewardly displaceable from the yokes, and holes positioned at at least two elevations on the upright members to be engaged by the pins. In another embodiment the apparatus is in the form of a pair of rods which are inserted through pairs of holes formed in the support legs and upright members at the desired elevations. In a third embodiment, the apparatus includes a pair of pins fixed to the support legs and positioned to slide in a vertical direction in slots formed in the upright members. Lever arms having notches corresponding to the desired elevations are positioned in the upright members to be engaged by and to support the pins. In each embodiment, the yokes can be disengaged from their respective members so that the way tubes may be pivoted to a vertical position.

11 Claims, 20 Drawing Figures

HEADSTOCK ELEVATING APPARATUS

BACKGROND OF THE INVENTION

The present invention relates to power woodworking tools and, more particularly, to power woodworking tools of the type capable of performing a variety of woodworking operations.

Multipurpose woodworking tools typically include a frame, a pair of parallel way tubes extending along a longitudinal dimension of the frame, and a headstock mounted for slidable adjustment on the way tubes. The headstock includes a motor and power transmission system having a quill spindle and preferably two auxiliary output shafts or spindles, oriented at different elevations in a vertical plane passing through the headstock. The output spindles are adapted to drive various woodworking tools such as table saws, lathes, shapers, disc sanders, jointers, band saws and the like, which are mounted on the way tubes or on the yokes which join the ways together.

Examples of such multipurpose woodworking tools are shown in Goldschmidt et al. U.S. Pat. No. 2,964,075; Edgemond, Jr., et al. U.S. Pat. No. 2,927,612; and Parker et al. U.S. Pat. No. 3,282,309. The two most common tools, and two tools common to all of the woodworking tools disclosed in the aforementioned patents, are the table saw and lathe.

To adjust such a multipurpose woodworking tool to operate as a table saw, a circular saw blade is fitted on the quill spindle of the headstock, and an adjustable table is mounted on a carriage which slides on the way tubes and is positioned so that the saw blade extends upwardly through a slot formed in the table top. To adjust such a tool to function as a lathe, the adjustable table is removed from the carriage and the circular saw blade from the quill spindle. A drive center or faceplate is fitted onto the quill spindle, a tailstock assembly is mounted on the yoke joining the ends of the way tubes, and a tool rest is mounted on the carriage.

In each of the woodworking tools disclosed in the aforementioned patents, the way tubes which support the headstock cannot be raised or lowered relative to the frame. However, with some tools, such as that disclosed in the Parker et al. patent, the way tubes can be tilted from a horizontal to a vertical position so that the headstock can be used to perform a vertical drill press operation. Since the way tubes cannot be raised or lowered, the quill spindle of the headstock cannot be changed in elevation relative to the remainder of the woodworking tool. The height of the work surface of the saw table, which must be positioned above the quill spindle, is necessarily above the working height of the lathe.

Typically, a multipurpose woodworking tool has an quill spindle which is positioned at an elevation above the floor of the work area such that the lathe operation is performed approximately 38 to 39 inches above the floor. When that same tool is adjusted to operate as a table saw, the working height of the saw table above the floor is approximately 40 to 43 inches. However, it is more desirable to perform a table sawing operation in which the work surface of the saw table is substantially lower than that for saw tables of the aforementioned multipurpose woodworking tools, an optimum height being 34 to 36 inches above the floor of the work area; and to perform a lathe operation at an optimum height which is above that of the table saw and above that of prior art multipurpose woodworking tools: approximately 41 to 42 inches above the floor.

The reason is that during lathe operations, the elbows of the user usually are bent, and the user's hands usually are held approximately 26 to 28 inches from his eyes. Also, lathe operations typically take a longer period of time to complete than a table sawing operation, and it is uncomfortable for a user to remain hunched over a low lathe for significant periods of time. Conversely, it is desirable to have a lower work surface for a table saw so that the height a workpiece must be raised from the floor or a stack to the saw table is minimized, thereby minimizing the labor required to set up the table saw and workpiece for a sawing operation. Furthermore, table sawing operations do not require close visual observation and hand-to-eye distance is typically 32 to 34 inches, so that the user need not hunch over the table.

Consequently, while multipurpose woodworking tools have the advantage of providing a number of woodworking functions for a price which is below that of the combined costs of the corresponding single function tools if purchased separately, and such tools fit in a work space which is significantly smaller than the total required for the corresponding single function tools, the multipurpose tools possess a disadvantage in that the output spindle must be positioned at a height which is a compromise between the optimal heights for operating a table saw and a lathe. The result is that the table saw working height is somewhat above the optimum height for a table saw, and the lathe working height is somewhat below the optimal height for a lathe.

Accordingly, there is a need for a multipurpose woodworking tool which can be adjusted relatively easily to elevate the output spindle of the headstock so that, when adjusted to perform a table sawing operation, the tool provides a working height for the table which approximates to the optimal height for a table saw, and can be adjusted to perform a lathe operation at a working height which is optimal for a lathe. Preferably, the elevating apparatus should be sufficiently flexible to allow the way tubes and headstock to be tilted to a vertical position so that the woodworking tool can be adjusted to perform a drill press operation, shaping operation and the like.

SUMMARY OF THE INVENTION

The present invention provides a multipurpose woodworking tool in which the supporting frame incorporates a pair of upright members at each end projecting above the corners of the frame; the yokes connecting the ends of the way tubes supporting the headstock include downwardly depending legs at their ends; and these downwardly depending yoke legs are adjustably supported by the upright members so that the way tubes can be raised and lowered relative to the frame to position the output spindles of the headstock at elevations optimal for performing specific woodworking operations. Preferably, the way tubes can be raised so that the quill spindle of the headstock is at a height optimal for performing a lathe operation, and lowered from that position so that the quill spindle is at a height to power the circular saw blade of a table saw so that the table is at an optimal height. However, it is within the scope of the invention to provide upright members which support the yoke legs at a plurality of heights so that the quill spindle can be positioned at optimal heights for a number of different woodworking operations.

In a preferred embodiment, the yoke legs each include a pair of pins which are spring-loaded to extend sidewardly therefrom, and the upright members each include pairs of opposing holes shaped and positioned to receive the pins. To raise or lower the way tubes and headstock, the pins are retracted into the yoke legs so that the yokes can be moved relative to the upright members.

Since the way tubes, yokes and headstock are relatively heavy, it is desirable to adjust the elevation of the way tubes relative to the frame one end at a time. The support pins of one yoke are disengaged from their associated upright members and the way tubes pivoted about the pins of the other yoke at the opposite end of the way tubes, which remain engaged with the corresponding holes of the upright members at that end of the frame. The pins of the second yoke are then retracted and that end raised or lowered relative to its upright members so that the way tubes are again positioned substantially horizontally.

In another embodiment, the yoke legs are modified so that holes are substituted for the retractable pins, the pairs of holes in the upright members extend completely through the members, and rods are provided which are inserted through the upright members and the yoke legs to connect them and act as hinges. To adjust the elevation of the headstock, the rod at one end is removed from the upright members and yoke legs, and the yoke is raised or lowered to position its leg holes in registry with a different pair of holes formed in the upright members. The rod is reinserted to attach the yoke to the upright members. The procedure is repeated at the opposite end of the way tubes to raise or lower that end to level the way tubes and headstock.

In a third embodiment, each pair of yoke legs includes a fixed pin which slides upwardly and downwardly in opposing slots formed in the adjacent pair of upright members. Levers are pivotally attached to each upright member and include notches for engaging the pins and supporting the way tubes at the desired elevations. The levers are biased to rotate against the pins so that, as an end of the way tubes is elevated, the pins slide against an abutting surface of the levers from one support notch to the next. The levers are fixed in a locking position by an overcenter link arrangement which can be unlocked or locked by the movement of a hand lever attached to an end of the frame.

Each of the aforementioned embodiments includes structure which allows the yoke legs at one end of the way tubes to be disconnected completely from the adjacent upright members. This enables the way tubes to be pivoted about an opposite end to a substantially vertical position for such operations as shaping and drilling.

Accordingly, it is an object of the present invention to provide a multipurpose woodworking tool in which the headstock and output spindles can be adjusted in elevation so that accessory tools can be powered at a working height which approximates an optimal working height for that accessory tool; a multipurpose woodworking tool in which the headstock height can be adjusted relatively easily and quickly by one person and without the use of additional tools; and a multipurpose woodworking tool in which the headstock can be adjusted in elevation which is relatively economical to fabricate and does not require expensive and closely-tolerenced components.

Other objects and advantages of the present invention will be apparent from the following description, the accompanying drawings and the appended claims.

DETAILED DESCRIPTION OF THE PREFERRED EMBODIMENTS

Figure 1:
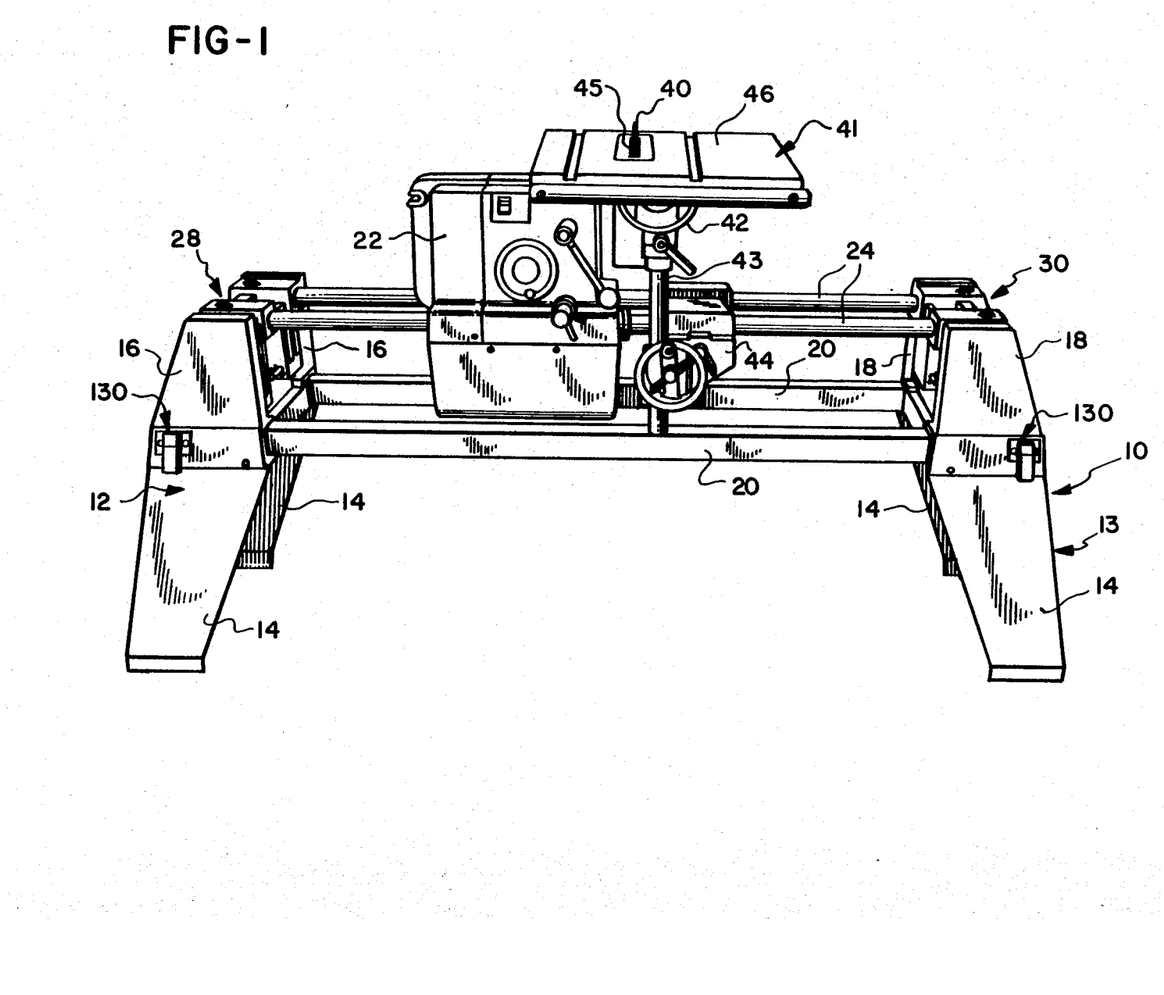
FIG. 1 is a perspective view of a multipurpose woodworking tool incorporating the elevating apparatus of the present invention in which the headstock and way tubes are in a lowered position and a saw table assembly is mounted on the way tubes.
Figures 2, 3:
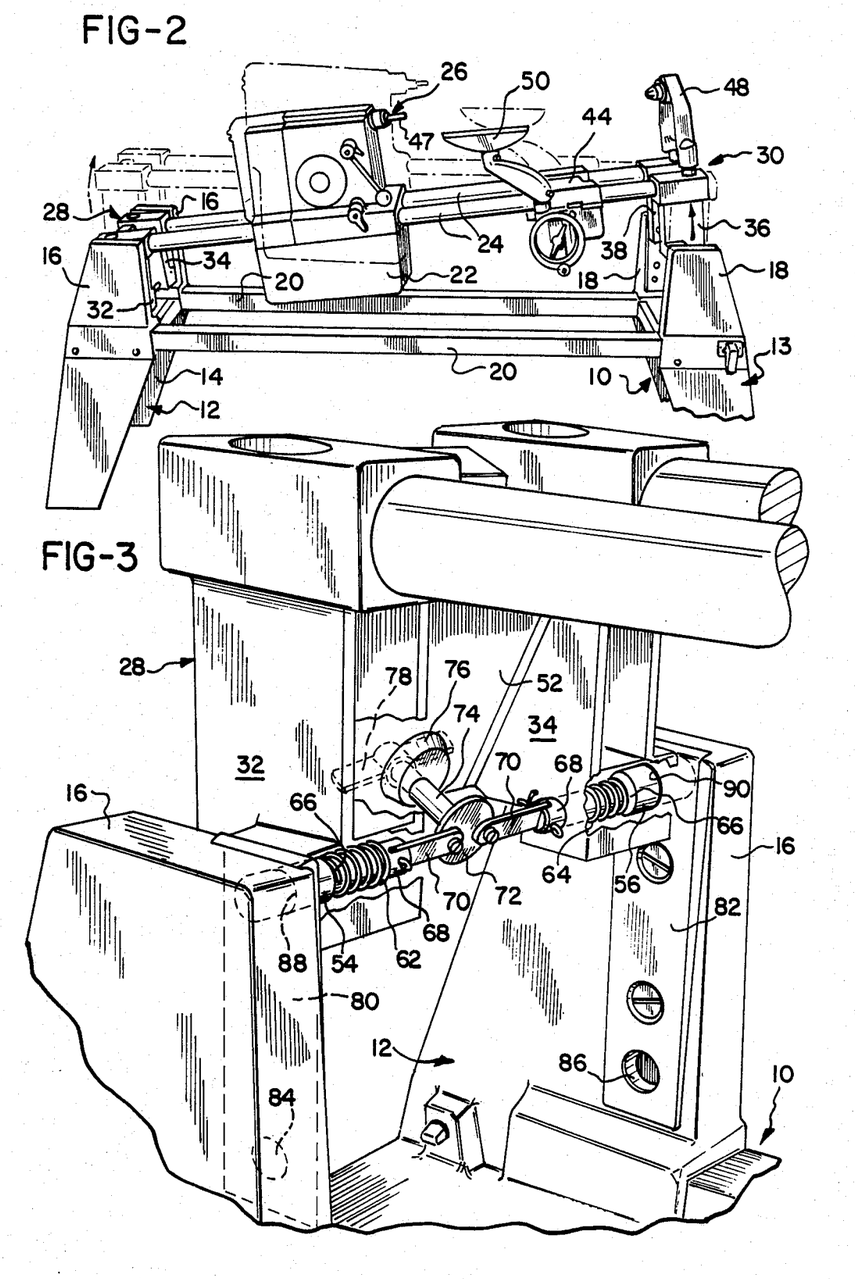
FIG. 2 is a perspective view of a multipurpose woodworking tool incorporating the elevating apparatus of the present invention in which one end of the way tubes has been elevated, the fully elevated position of the way tubes and headstock being shown in phantom and in which a lathe accessory is mounted on the way tubes and yoke.
FIG. 3 is a detail in perspective of the headstock elevating apparatus of FIGS. 1 and 2 in which the yoke legs have been partially broken away.

As shown in FIGS. 1 and 2, the multipurpose woodworking tool of the present invention includes a frame 10 having ends 12, 13 with legs 14 and pairs of upright members 16, 18. The ends 12, 13 are joined by a pair of parallel rails 20 to make a substantially rigid structrue.

A headstock 22 is slidably mounted on a pair of parallel way tubes 24 which are parallel to the rails 20. The headstock 22 resembles in internal structure the headstock disclosed in Edgemond, Jr., et al. U.S. Pat. No. 2,927,612, the disclosure of which is incorporated herein by reference. As shown more fully in that patent, the headstock 22 includes a motor which is operatively connected to and drives an output or quill spindle 26 and two auxiliary output spindles (not shown).

The way tubes 24 are joined together and supported at their ends by yokes 28, 30. Yoke 28 includes a pair of downwardly depending legs 32, 34, and yoke 30 includes a pair of downwardly depending legs 36, 38.

The quill spindle 26 from the headstock 22 may be fitted with an accessory tool such as a circular saw blade 40 (FIG. 1). A saw table 41 is attached to a pivot 42 which is supported by legs 43. Legs 43 are racked and mesh with pinions located in a carriage 44 mounted on way tubes 20. The table 41 is located such that the blade 40 extends upwardly through a slot 45 formed in the table top 46. Alternately, the quill spindle 26 can support a drive center or faceplate 47, the yoke 30 fitted with a tail stock 48, and a tool rest 50 mounted on the carriage 44 so that the woodworking tool can perform a lathe operation. The details of the quill spindle 26, drive center 47, tail stock 48 and tool rest 50 are described more completely in the aforementioned patent to Edgemond, Jr. et al. The table 41, pivot 42, legs 43 and carriage 44 are described more fully in a copending application Ser. No. 552,599, filed Nov. 16, 1983, in the name of Bartlett et al., the disclosure of which is incorporated herein by reference.

Figures 4, 5, 7:
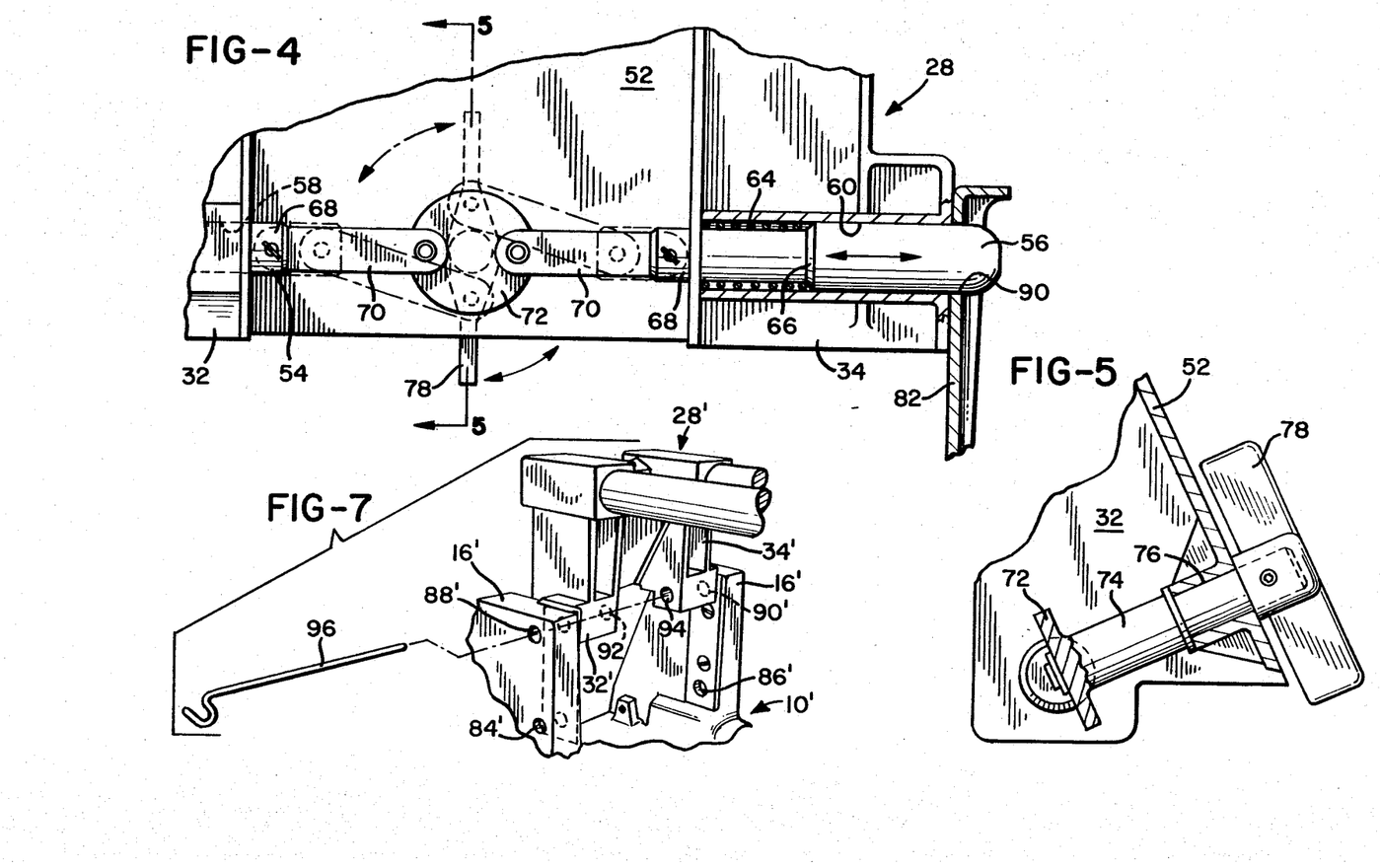
FIG. 4 is a detail, partially in section, of the headstock elevating apparatus of FIG. 3.
FIG. 5 is a detail in section of the headstock elevating apparatus, taken at line 5—5 of FIG. 4.
FIG. 7 is a perspective exploded view showing a detail of an alternate embodiment of the invention.

The details of yoke 28 and upright members 16 are shown in greater detail in FIGS. 3, 4, and 5. Since the structure of yoke 30 is identical to that of yoke 28, and the structures of the frame ends 12, 13 are identical, the discussion will be limited to yoke 28 and its associated frame end 12, with the understanding that it applies to yoke 30 and its associated frame end 13 as well.

Legs 32, 34 of yoke 28 are joined together by a plate 52. Yoke legs 32, 34 support pins 54, 56 for slidable movement within channels 58, 60 in a direction which is sidewardly and outwardly from the yoke 28. Channels 58, 60 seat coil compression springs 62, 64 which urge against shoulders 66 formed on the pins 54, 56 so that the pins are biased to a position in which they extend outwardly from the yoke legs 32, 34.

The inner ends 68 of the pins 54, 56 are pivotally connected to links 70 which in turn are pivotally connected to a disc 72. Disc 72 is integral with a shaft 74 that is rotatably mounted within a boss 76 formed in the plate 52. An end 72 of the shaft 74 opposite the plate 52 protrudes outwardly from the plate and is attached to a handle 78. Upright members 16 have substantially vertically extending plates 80, 82 which include lower holes 84, 86 and upper holes 88, 90; respectively.

As shown in FIG. 4, rotation of the handle 78 causes the shaft 74 and disc 72 to rotate, thereby drawing the links 70 and pins 54, 56 inwardly until the outer ends of the pins are within the channels 58, 60. As shown in FIG. 3, the holes 84–90 face inwardly, and the upright members 16 are spaced apart such that the legs 32, 34 of the yoke 28 fit therebetween. The holes 84, 86 are sized and positioned to receive the ends of the pins 54, 56 and are positioned relative to the frame 10 such that the headstock 22 (FIGS. 1 and 2) is positioned at a height for powering a table saw blade 40 so that the table top 46 is at an optimal height when the pins 54, 56 engage the holes 84, 86.

The holes 88, 90 are positioned at an elevation such that, when engaged by the pins 54, 56, the headstock 22 is at an elevation appropriate for use with the faceplate 47, tool rest 50 and tail stock 48 components to perform a lathe function. Again, in the preferred embodiment the saw table 46 may be positioned at a height of approximately 34 to 35 inches above the floor of the work area when the way tubes 24 and headstock 22 are in the lowered position, and the upper edge of the tool rest 50 is at an elevation of approximately 41 to 42 inches above the floor as a result of the repositioning of the way tubes and headstock to the raised position for use as a lathe.

Figure 6A:
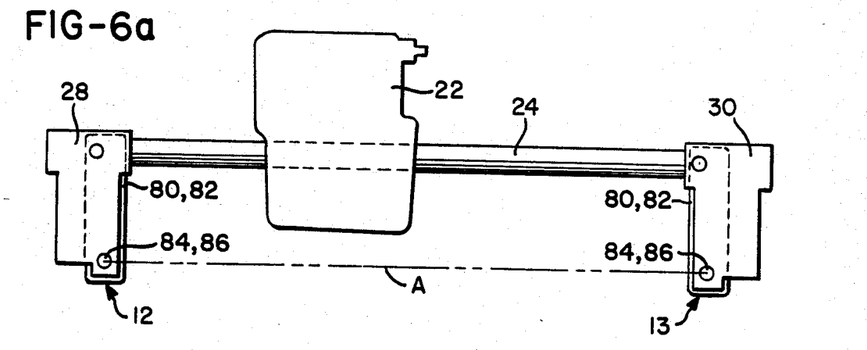
FIGS. 6a, 6b, and 6c are somewhat schematic side elevations of the headstock elevating apparatus of the invention, and show the sequence of steps required to raise or lower the headstock.
Figure 6B:
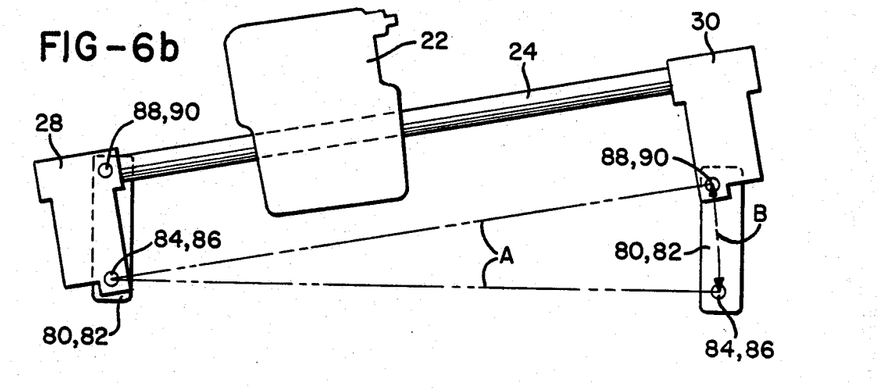
Figure 6C:
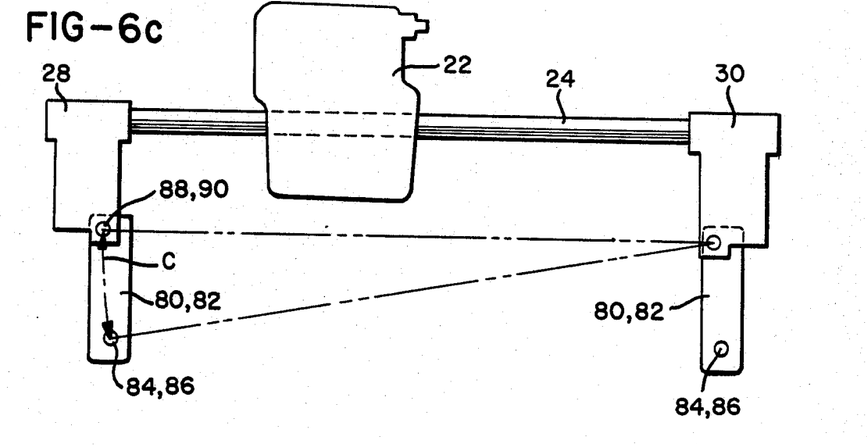

The sequence of adjusting the elevation of the headstock is shown in FIGS. 6a–6c. The headstock 22 is shown in FIG. 6a in the lowered position, in which the pins (not shown) in the yokes 28, 30 are inserted into the lower holes 84, 86 of the plates 80, 82 in the upright members 16, 18 (FIG. 2) of the frame 10. Since the yokes 28, 30 are fixed relative to each other, the distance between the pins is constant and is represented by line A. To begin the elevating procedure, the pins 54, 56 of the legs 36, 38 (FIG. 2) of yoke 30 are retracted inwardly from holes 84, 86 associated with end 13 of the frame 10, thereby disengaging the yoke 30 from end 13. The way tubes 24 and headstock 22 are tilted upwardly such that the way tubes and headstock pivot about the pins associated with end 28, which remain engaged with the holes 84, 86 at end 12.

The pivotal movement of the way tubes 24 and yoke 30 causes the pins to describe an arc designated by line B in FIG. 6b. The way tubes 24 and yoke 30 are pivoted until the pins are positioned in registry with the holes 88, 90 formed in end 13. The pins, which are spring-biased outwardly, will automatically snap outwardly and engage the holes 88, 90 at that time. The pins are retained within the legs 36, 38 as yoke 30 is being pivoted by sliding engagement with the plates 80, 82 at end 13.

The completion of the elevating procedure is shown in FIG. 6c. The pins associated with yoke 28 are withdrawn into the legs 32, 34 (FIG. 3) thereby disengaging holes 84, 86. Yoke 28 is then pivoted about the pins associated with end 30 such that the way tubes 24 and headstock 22 describe an arc C. Again, the pins in yoke 28 are prevented from extending outwardly by sliding engagement with the adjacent plates 80, 82 until the pins are in registry with upper holes 88, 90, whereupon they spring outwardly automatically.

Thus, with a two-step procedure, the headstock 22 and way tubes 24 are adjusted from a lowered position shown in FIG. 6a, which is optimal for supporting and powering a table saw 42 (FIG. 1), to a raised position shown in FIG. 6c in which the headstock 22 and way tubes 24 are positioned at an elevation which is optimal for the operation of a lathe as shown in FIG. 2. It should be noted that, in order to accomplish this two-step procedure, the upper holes 88, 90 are offset from the lower holes 80, 82 so that they lie along arcs B and C. It is also important to note that, given the vertical orientation of the holes 84–90 shown in FIGS. 6a–6c, the two-step procedure for elevating the headstock can be effected only by first elevating yoke 30, then elevating yoke 28; an attempt to elevate yoke 28 first would result in the pins being pivoted along an arc (not shown) which would not bring them in registry with holes 88, 90 of associated end 12.

Of course, to lower the headstock 22 from its raised position in FIG. 6c to its lowered position in FIG. 6a, the two-step method is reversed in sequence. The yoke 28 is first lowered, thereby moving its pins along arc C to holes 84, 86 of that frame end, then yoke 30 is lowered, moving pins along arc B to holes 84, 86 of that frame end.

Although FIGS. 1-6 show a preferred embodiment of the invention, the same advantages in ease of adjustment as well as a simplified and economical construction can be achieved with the embodiment shown in FIG. 7. With this embodiment, the woodworking tool includes a frame 10' which is identical in all respects to the frame 10 illustrated in FIGS. 1-6, except that the holes 84-90 extend through the upright members 16'. The yoke legs 32', 34' of end 28' do not support the spring-loaded pin arrangement shown in FIGS. 3-6; rather, they include holes 92, 94 which extend through yoke legs 32', 34'. A rod 96 is merely inserted through the holes 88', 90', and holes 92, 94 to position the yoke 28' at the raised elevation.

To lower the end 28', the rod 96 is withdrawn from the holes, and the end lowered until the holes 92, 94 are in registry with the holes 84', 86'. The rod 96 is then inserted through the sets of holes so that the upright members 16', 18' support the yoke 28'. The procedure for raising and lowering the headstock and way tubes relative to the frame is the same as that discussed in relation to FIGS. 6a-6c. When one of the ends of the way tubes is pivoted upwardly or downwardly, the opposite end pivots about its associated rod 96.

Figure 8:
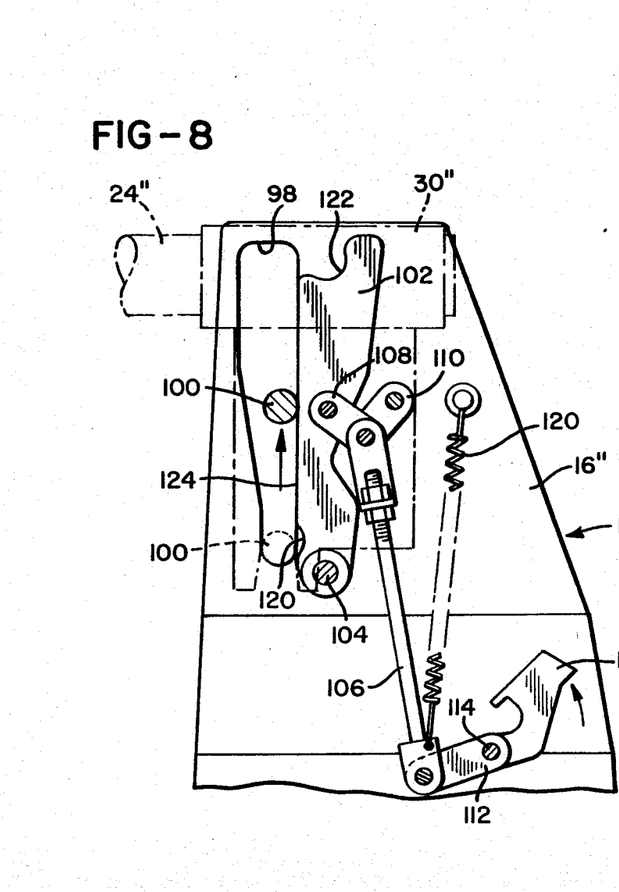
FIG. 8 is a detail side elevation, partly schematic, showing a third embodiment of the invention in which the headstock is in a lowered position.
Figure 9:
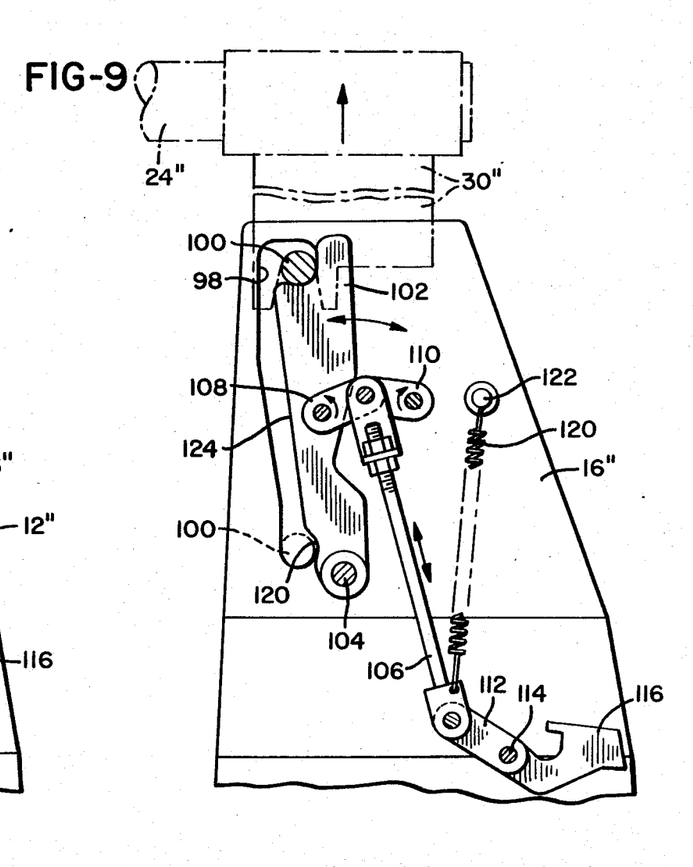
FIG. 9 shows the detail of FIG. 8 in which the headstock is in a raised position.
Figure 10:
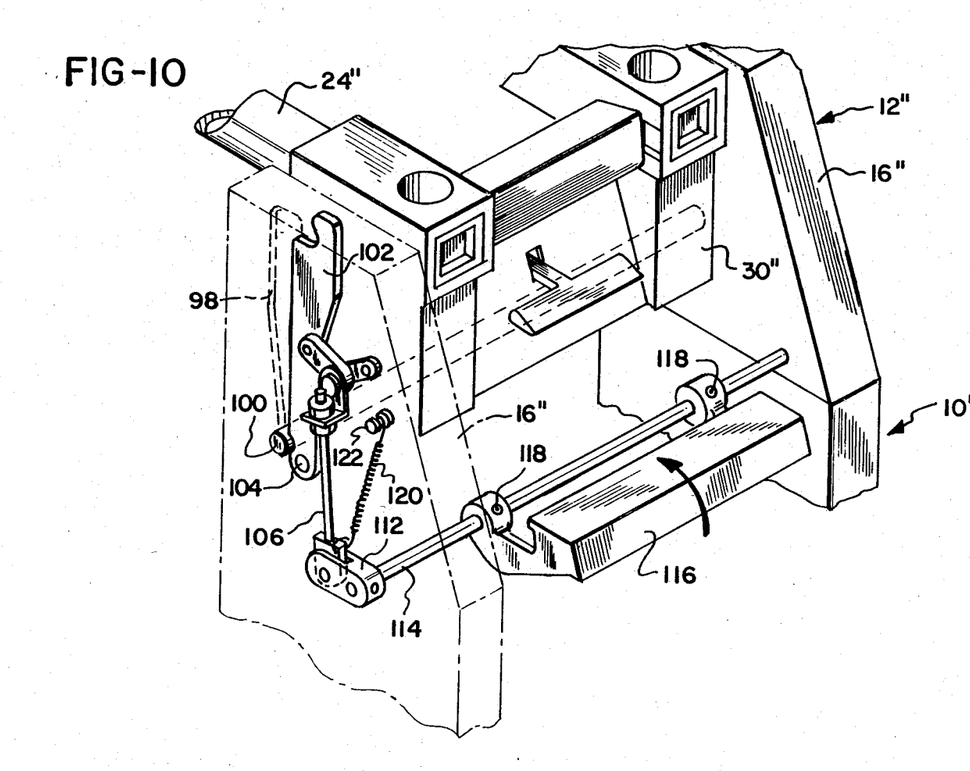
FIG. 10 is a detail in perspective of the embodiment of FIGS. 8 and 9 in which one of a pair of upright members is shown in phantom.

A third embodiment of the invention is shown in FIGS. 8-10. In this embodiment, the upright members 16", 18" are modified to include vertically extending slots 98, and the yoke 30", as well as the opposite yoke (not shown), are modified to include a single, fixed pin 100, which extends outwardly from the yoke to ride within the slots 98. Each of the upright members 16", 18" includes a lever 102 which is attached at a lower end thereof to the upright member by a pivot pin 104.

An actuator rod 106 is attached to the lever 102 by a link 108 at an upper end thereof, and to the upright member 16" by a link 110. The lower end of the actuator rod 106 is pivotally attached to an arm 112 which is rigidly attached to an axle 114. Axle 114 extends through the upright members 16", 18" and is rotatably attached thereto. An actuator handle 116 is attached to the axle 114 by set screws 118 such that movement of the handle causes the axle to rotate. Actuator rod 106 is biased upwardly by a coil spring 120 which is attached at an upper end thereof to a stud 122 mounted on the upright member 16".

By lifting the handle 116 upwardly as shown in FIG. 8, the arm 112 pivots about the rotating axle 114 thereby drawing the actuator rod 106 downwardly. The downward movement of the actuator rod 106 causes the lever 102 to pivot away from the slot 98 about pivot pin 104. A downward movement of the handle 116 as shown in FIG. 9 causes the arm 112 to rotate upwardly about axle 114, thereby urging the actuator rod 106 upwardly, which causes the lever 102 to pivot toward the slot 98. The links 108, 110 are arranged such that in the position as shown in FIG. 9, the actuator rod is in an over-center locked position so that the lever 102 cannot be moved rearwardly by pressure from the pin 100.

The lever 102 includes a lower notch 124 and an upper notch 126 shaped to receive and support the pin 100. The surface 128 of the lever 102 facing the pin 100 is machined to provide a bearing surface against which the pin 100 will move when the headstock is elevated. It should be noted that, although the elevating apparatus is shown with regard only to upright member 16" of the end 12" of this embodiment, the structure within the other upright members is identical.

In order to raise the yoke 30" relative to the frame end 12", the lever 116 is lifted as shown in FIG. 8. This displaces the actuator rod 106 downwardly from its over-center, locked position (FIG. 9) and permits the yoke 30" to be lifted relative to the end 12". The lever 102 is spring-biased against the rod 100 by the spring 120, so that as the yoke 30" is raised, the pin 100 slides from the notch 120 along the bearing surface 124 to the upper notch 126. As the pin leaves the end of the bearing surface 128, the lever 102 rotates forwardly toward the slot 98 and into a supporting position with the pin. The lever 102 is locked into position by rotating the handle 116 downwardly as shown in FIG. 9, thereby returning the actuator rod 106 to its over-center, locked position. As shown in FIGS. 8 and 9, the pin 100 can be locked by levers 102, thereby locking the way tubes 24" in a lowered position or a raised position. The sequence for raising and lowering the headstock and way tubes 24" is the same as that previously described and shown in FIGS. 6a-6c.

Figures 11, 18:
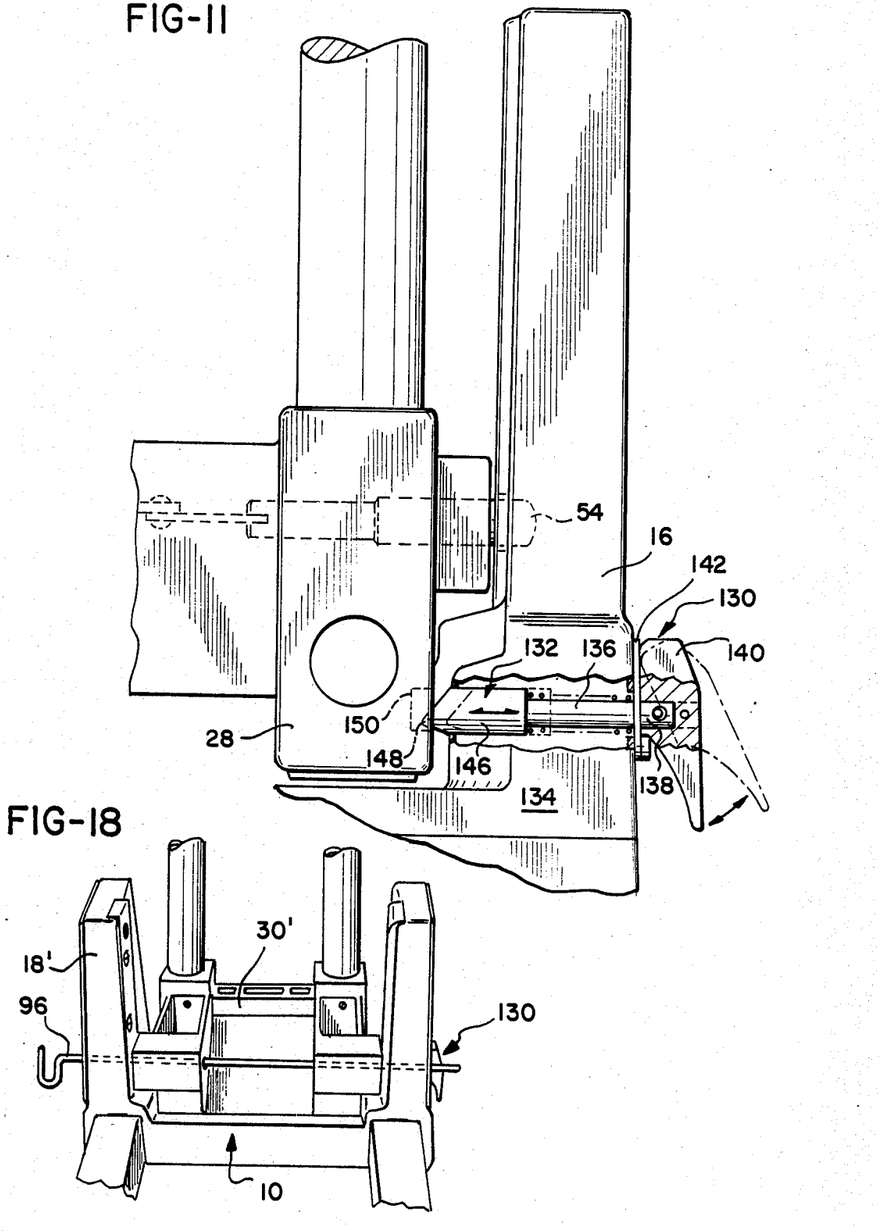
FIG. 11 is a detail of the multipurpose tool of FIGS. 1-5 in which the way tubes have been pivoted to a vertical position.
FIG. 18 is a detail, perspective view of the multipurpose tool of FIG. 7 in which the way tubes are pivoted to a vertical position.
Figure 12:
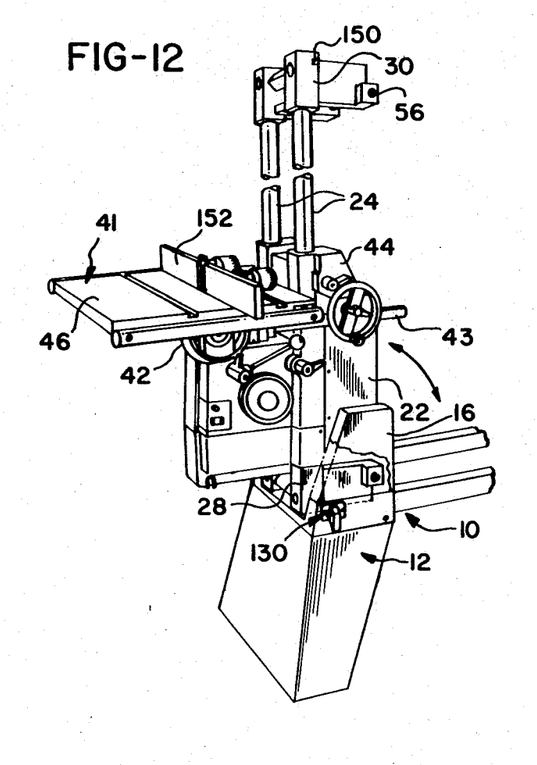
FIG. 12 is a detail of the multipurpose tool of FIGS. 1-5 in which the way tubes are pivoted to a vertical position and the tool is adjusted to perform a shaping operation.
Figure 13:
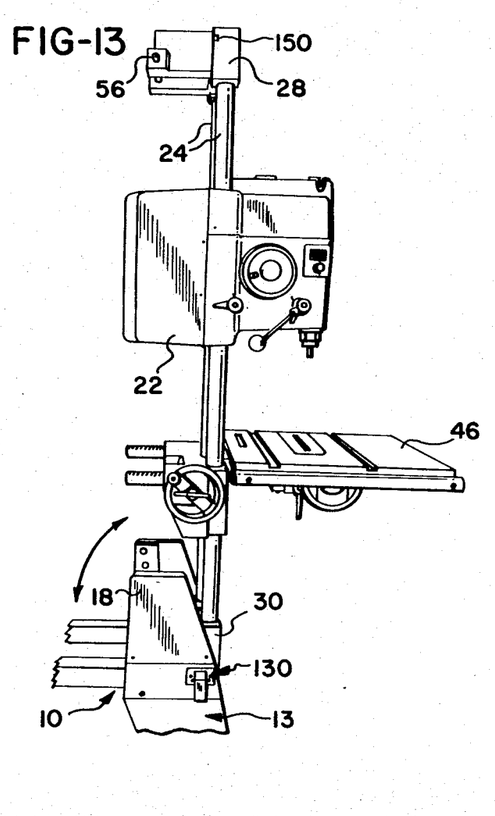
FIG. 13 is a detail of the multipurpose tool of FIG. 12 in which the way tubes are pivoted about an opposite end thereof and the tool adjusted to perform a drill press operation.
Figure 14:
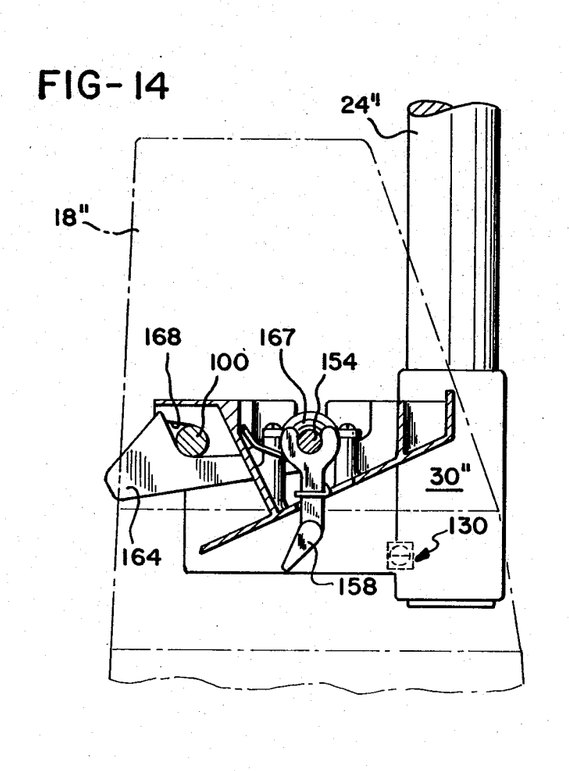
FIG. 14 is a detail of the multipurpose tool of FIGS. 8-10 in which the way tubes are pivoted to a vertical position, and the upright member is shown in phantom.
Figure 15:
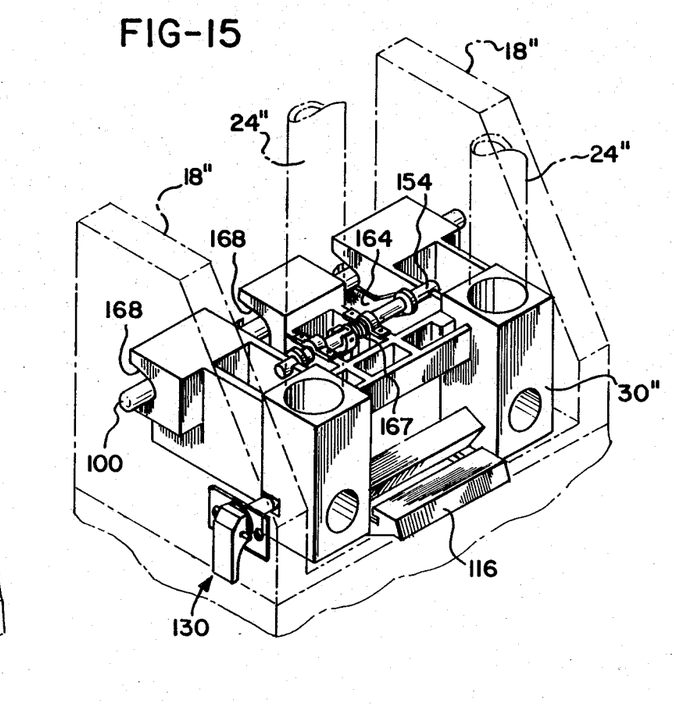
FIG. 15 is a perspective view of the tool of FIG. 14 in which the way tubes and upright members are shown in phantom.

Another advantage of the present invention is that, with each of the aforementioned embodiments, the way tubes 24 are capable of being pivoted about either of the ends 12, 13 of the frame 10 to a substantially vertical position, as shown in FIGS. 12 and 13. Common to all of the aforementioned embodiments is a locking mechanism which prevents the way tubes 24 from tilting from the vertical positions shown in FIGS. 12 and 13. The locking mechanism comprises a pair of bullet catches, generally designated 130, located within one of each of the pairs of upright members 16, 18. As shown in FIG. 11, each bullet catch 130 includes a pin 132 slidably mounted within a base 134 of the upright member 16, 18, and includes a shank 136 having an end 138 protruding from the base and pivotally attached to a lever 140.

The lever 140 pivots against a plate 142 which is attached to an outside surface of the base 134. A coil spring 144 is seated against an inside wall of the plate 142 and urges against the head 146 of the pin 132. The head 146 includes a pointed nose 148 that is positioned to engage a notch 150 (also shown in FIGS. 12 and 13) formed in the adjacent sides of the yokes.

For the embodiment of the multipurpose tool shown in FIGS. 1-5, the way tubes 24 are pivoted to a vertical position shown in FIG. 12 by disengaging the pins 54, 56 (FIG. 3) from their respective holes 84, 86 in end 18 and lifting the yoke 30 upwardly until the way tubes 24 are vertical. As the way tubes 24 are being raised, the opposite yoke 28 pivots about its respective pins 54, 56 which remain inserted in holes 84, 86 of upright members 16. When the way tubes reach the desired vertical position, the tapered nose 148 of the bullet catch 130 engages the notch 150 and locks the way tubes in this position. It is understood that other types of locking mechanisms may be employed without departing from the scope of the invention. For example, the locking mechanism could comprise a bolt threaded into an upright member such that it could be advanced into or retracted from the notch 158.

The saw table 41 may then be adjusted so that the table top 46 lies in a substantially horizontal plane by tilting the pivot 42 relative to the legs 43. The carriage 44 is then moved to a position adjacent the headstock 22 so that the quill spindle 26 (FIG. 2) is inserted into the table slot 45 (FIG. 1). A fence 152 of well-known design may be attached to the table top 46, and the woodworking tool operated to function as an under-the-table shaper.

To tilt the way tubes 24 about upright members 18 as shown in FIG. 13, the process is repeated except that the pins 54, 56 in yoke 28 are disengaged from upright member 16, and the way tubes 24 are pivoted about the pins in yoke 30. The table 41 and legs 43 are then removed from the carriage 44, rotated 180°, then reinserted into the carriage to provide a substantially horizontal surface below the headstock 22 so that the woodworking tool can function as a vertical drill press. This process is described more fully in the aforementioned copending U.S. application Ser. No. 552,599, filed Nov. 16, 1983.

In order to tilt the way tubes 24" of the woodworking tool embodiment shown in FIGS. 8, 9 and 10, it is necessary to disengage the pin 100 from the yoke 30" so that the yoke may be lifted above the upright members 16" of the frame 10". The pin release mechanism, generally designated 152, is shown in FIGS. 14, 15, 16 and 17. Since the pin release structure 152 is the same for both yokes 28", 30", the description will be limited to the release mechanism shown in yoke 30", it being understood that it applies to the release structure for yoke 28" as well.

Pin release mechanism 152 includes an axle 154 which is rotatably attached to the yoke 30" by journal bearings 156. A handle 158 is fixed to the axle 154 by a pin 160 and extends rearwardly from the axle through an opening 162 in the yoke 30". A pair of elongated fingers 164 are attached to the axle 154 and extend downwardly therefrom. The lower ends of the fingers include shoulders 166 which are shaped and positioned to engage the pin 100. A coil spring 167 is mounted on axle 154 and urges against the yoke 30" at one end and against the handle 158 with the other, thereby biasing the fingers 164 against the pins 100 so that the pin is held against a channel 168 formed in the lower surface of the yoke 30".

Figure 16:
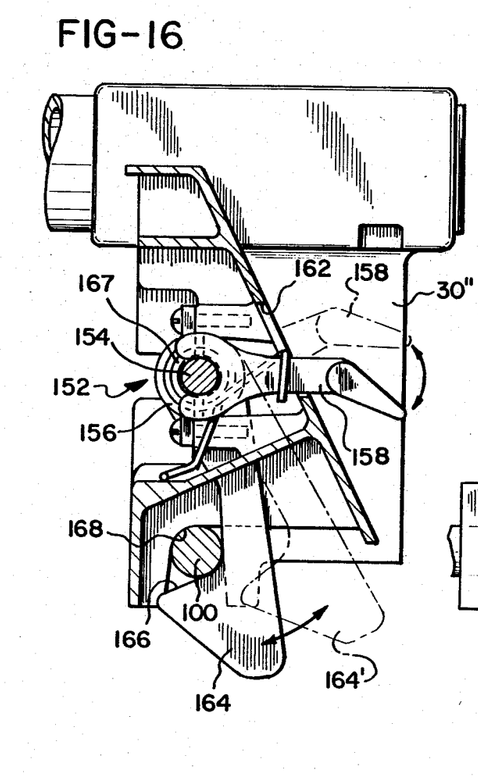
FIG. 16 is a detail side elevation of the release mechanism of the tool of FIG. 14, taken at line 16—16 of FIG. 17.
Figure 17:
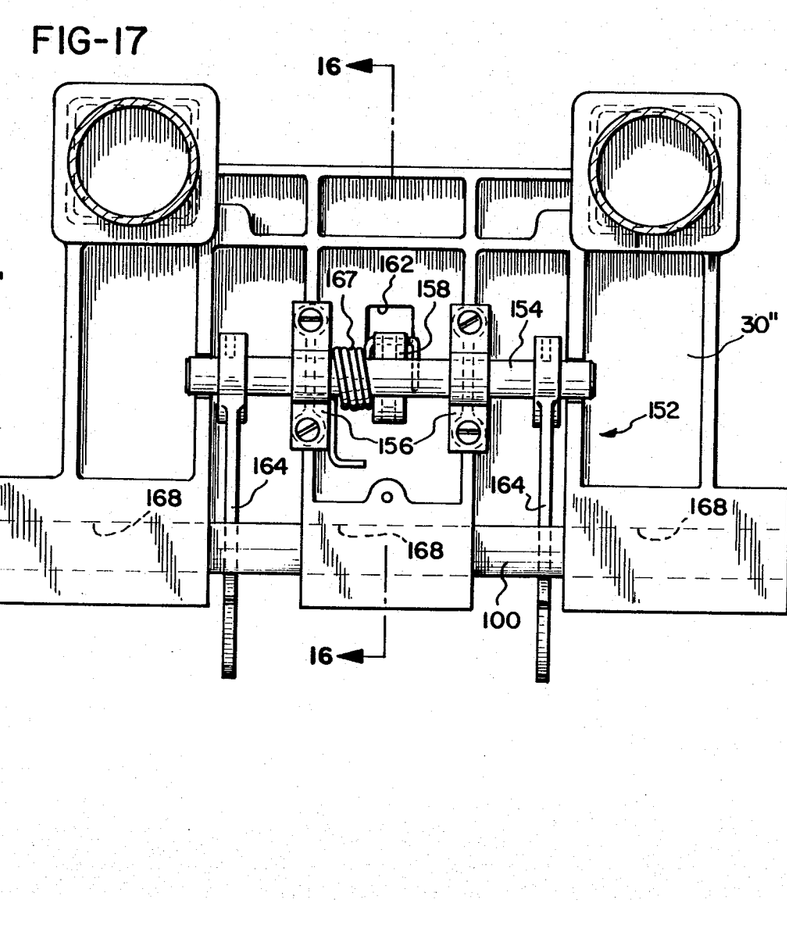
FIG. 17 is a detail end elevation of the release mechanism of FIG. 16.

In order to release the pin 100 from its engagement with the yoke 30", the handle 158 is lifted upwardly from the position shown in solid lines in FIG. 16, to that shown in phantom. This rotates the axle 154 which in turn rotates the fingers 164 from their position shown in solid to that shown in phantom, thereby removing the shoulders 166 from their engagement with the pin 100. Then, with the pin 100 disengaged from the yoke 30", that yoke and the way tubes 24" may be raised to the vertical position shown in FIG. 12 for the embodiment of FIGS. 1-5. As yoke 30" is raised, the opposite yoke (not shown) pivots relative to its pair of upright members about its associated pin. To position the way tubes 24" in the vertical position shown in FIG. 13 for the embodiment of FIGS. 1-5, the process is repeated except that the opposite yoke is elevated and yoke 30" pivots relative to upright members 18".

For the embodiment of the multipurpose woodworking tool depicted in FIG. 7, the tilting procedure is simply a matter of removing the rod 96 from the yoke to be lifted upwardly above the frame of the tool, and allowing the bullet catch 130 to engage the notch 150 (FIGS. 12 and 13) as the opposite end pivots about its respective rod 96, as shown in FIG. 18 for yoke 30' and upright members 18'.

It is understood that, although the foregoing embodiments shown upright members with two sets of holes for positioning the yokes at two elevations, it is within the scope of the invention to provide upright members with several sets of holes so that the yokes can be positioned at several elevations, each for positioning the quill spindle at a height optimal for a particular woodworking function. With such an embodiment, the process for raising and lowering the yokes, way tubes and headstock would be the same as set forth previously for the embodiments depicted in FIGS. 1-18.

While the forms of apparatus herein described constitute preferred embodiments of the invention, it is to be understood that the invention is not limited to these precise forms of apparatus, and that changes may be made therein without departing from the scope of the invention.

What is claimed is:

1. In a multipurpose woodworking tool of the type having a frame, a pair of parallel way tubes extending longitudinally of said frame, and a headstock mounted on said way tubes, the improvement comprising:
   first and second yoke means for joining said way tubes together at opposite ends thereof;
   first and second support means extending upwardly from said frame at opposite ends thereof and located adjacent to said first and second yoke means, respectively; and
   means forming a plurality of releasable pivot connections between each pair of said first yoke means and said first support means, and said second yoke means and said second support means, said pivot connection means including a pair of first components, each attached to a different one of said first and second yoke means, and a pair of second components, each attached to a different one of said first and second support means and adapted to engage a corresponding one of said first components to form said pivot connection at a low position relative to said frame and at least one high position relative to said frame and located above and offset from said low position;
   whereby said way tubes and headstock may be adjusted from a low position to a high position by a procedure in which (a) said first component on said second yoke means is disengaged from said low position on a corresponding one of said second components on said second support means, (b) said second yoke means is raised and said first component thereof is attached to said high position of said corresponding second component, thereby pivoting said first component of said first yoke means relative to said corresponding second component of said first support means, (c) said first component of said first yoke means is disengaged from said low position of said second component is said first support means, and (d) said first yoke means is raised and said first component thereof engages said high position of said corresponding first component, thereby pivoting said first component of said second yoke means relative to said second component engaged therewith; and said headstock may be adjusted from a high position to a low position by reversing said procedure.

2. The tool of claim 1 wherein said support means comprises pairs of upright members, each of said pairs spaced apart to receive an associated portion of said yoke means therebetween.

3. The tool of claim 2 wherein said pivot connection means comprises pin means; and said upright members include means thereon at locations corresponding to said low and high positions for receiving and supporting said pin means.

4. The tool of claim 3 wherein said locations of said pin support means are offset such that ones of said pin support means on said second support means lie along a first arc having a center coinciding with said low position of said first support means; and ones of said pin support means on said first support means lie along a second arc having a center coinciding with said high position of said second support means.

5. The tool of claim 4 wherein each of said yoke means comprises a pair of downwardly depending legs attached at an end of said way tubes between an associated pair of said upright members, said legs housing said pin means.

6. The tool of claim 5 wherein said pin means includes, in each of said pairs of yoke legs, a pair of opposing pins slidably attached thereto for sideward and outward movement therefrom; means for biasing said pins in an outward position to engage said support means; each of said pins having a link arm pivotally attached to an inner end thereof; means, connected to said link arms, for simultaneously withdrawing said pins out of said support means engaging position; and said pin support means includes holes formed in said upright members for receiving said pins.

7. The tool of claim 5 wherein said pin means comprises a pair of rods, each associated with a different one of said yoke means and having a length sufficient to extend between said upright members; said pin support means comprises pairs of holes extending through said upright members and oriented to receive one of said rods therethrough; and each of said pairs of yoke legs includes holes therethrough for receiving one of said rods such that each of said rods may be inserted through selected ones of said holes in a different pair of said upright members and through said holes in an associated one of said yoke legs.

8. The tool of claim 5 wherein said pin means comprises a pair of elongate pins, each attached to one of said pairs of yoke legs and having ends extending outwardly therefrom; and said pin support means comprises a pair of opposing slots in each of said pairs of upright members, pairs of levers oriented substantially vertically and pivotally attached to said upright members at lower ends thereof, each of said levers having a bearing surface along a vertical edge therof positioned to be engaged by one of said ends of said pins, a notch at an upper end thereof, and means biasing said lever to rotate toward said pin such that said pins rest against lower ends of said slots when said way tubes are in a lowered position, and said pins slide against said bearing surfaces as said way tubes are elevated and are supported by said notches when said way tubes are oriented at a raised position; and means for selectively fixing said levers in a pin locking position thereby locking said way tubes in said lowered position or said raised position.

9. The tool of claim 8 wherein each of said yoke means includes a transverse channel along an underside thereof which receives an associated one of said pins; an axle rotatably attached to said yoke; handle means attached to said axle and extending rearweardly therefrom; finger means attached to said axle and extending therefrom to engage said associated pin; and means biasing said axle to rotate said finger means to contact said associated pin and cooperate with said channel to retain said associated pin thereagainst.

10. The tool of claim 5 further comprising means for locking said way tubes in a vertical position.

11. The tool of claim 10 wherein said locking means includes a pair of bullet catches attached to said pairs of upright members, and said yoke means each include a notch positioned to engage an adjacent one of said catches when an associated one of said yokes is pivoted to position said way tubes in a vertical position.

* * * * *

UNITED STATES PATENT AND TRADEMARK OFFICE
CERTIFICATE OF CORRECTION

PATENT NO. : 4,548,246

DATED : October 22, 1985

INVENTOR(S) : John G. Legler et al.

It is certified that error appears in the above-identified patent and that said Letters Patent is hereby corrected as shown below:

Column 10, line 5, "shown" should be --show--.

Column 10, line 60, "is" should be --of--.

Signed and Sealed this

Eighth Day of April 1986

[SEAL]

Attest:

DONALD J. QUIGG

Attesting Officer

Commissioner of Patents and Trademarks